Nov. 2, 1943.                H. M. LANG                  2,333,534
                        FIRST SURFACE MIRROR
                    Original Filed June 19, 1939
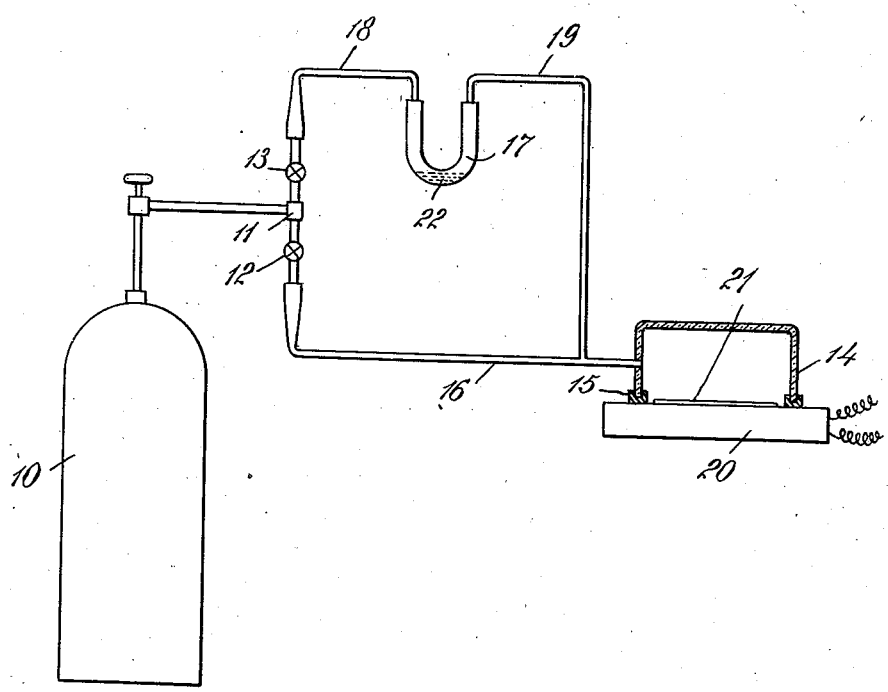
INVENTOR.
Harold Martin Lang
BY
ATTORNEY Patented Nov. 2, 1943

2,333,534

UNITED STATES PATENT OFFICE 2,333,534

FIRST SURFACE MIRROR

Harold Martin Lang, New Hyde Park, N. Y., assignor, by mesne assignments, to Sigmund Cohn & Co., New York, N. Y., a partnership composed of Sigmund Cohn, Sidney Cohn and Adolph Cohn Original application June 19, 1939, Serial No. 279,932. Divided and this application August 19, 1942, Serial No. 455,284

1 Claim. (Cl. 88—105)

This invention relates to first surface mirrors of improved construction for use in high grade optical instruments and its object is to provide mirrors which are comparatively inexpensive and have the characteristics required for reflectors of this type. These characteristics may be greater hardness, greater resistance to tarnish and corrosion, greater or more permanent reflectivity, and the desired color, finish or effect.

In United States Patent No. 2,304,182, issued to me December 8, 1942, I have described and claimed one method by which these improved mirrors may be made. The application for the aforesaid patent was copending herewith and this application is a divisional application of it. As stated in the aforesaid patent, it is well known that a film of nickel may be deposited upon a desired surface by directing nickel carbonyl in gaseous form against such a surface, heated above the temperature required to decompose the nickel carbonyl. In this manner nickel has been deposited for producing different kinds of surfaces varying from those resembling platinum black to those which are highly polished. It is often desirable to improve such films or coatings upon the latter type of surfaces by electroplating them, but it has not been possible to do so because during electroplating the tension of the electroplate causes the nickel film to blister and peel off from the surface upon which it has been deposited. I have discovered that this difficulty may be overcome by following the method which I will now describe and that articles of desired novel characteristics may be produced thereby.

The drawing which forms a part of this application is a diagrammatic representation of an apparatus for depositing films of nickel on heated surfaces.

In this drawing, 10 designates a source of supply of an inert gas, such as carbon dioxide or nitrogen under pressure. 11 designates a branched pipe through which the gas may be led through valves 12 and 13 and conduits to a chamber formed by a cover 14. The top of the cover may be transparent and, as a convenient way of accomplishing this, it may be formed of clear glass. Around the lower edge of the cover is a gasket 15.

20 is an electrically heated hot plate having a flat upper surface upon which the gasket 15 is adapted to rest. 21 designates the article, such as a flat piece of glass, upon which the desired film is to be formed.

16 is a tube through which gas from the supply tank may be passing through valve 12 directly to the chamber formed by the cover 14. 17 is a U tube, one end of which is connected by a tube 18 with the end of pipe 11 which is controlled by valve 13 and the other end of which is connected by a tube 19 with tube 16 which leads to the cover 14.

I will now describe a manner in which this apparatus may be used. With valve 13 closed, a small amount of nickel carbonyl is placed in the U tube, leaving a gas passage over its upper surface, as indicated at 22. The cover 14 is placed over the glass 21 and the temperature of the hot plate and the glass raised above that required to decompose nickel carbonyl. A temperature of about 150° C. is sufficient for this purpose. During this part of the operation air is expelled from the space surrounding the glass 21, by allowing inert gas to flow through valve 12 and conduit 16 into the chamber formed by the cover 14, from which it escapes under the gasket 15.

When the desired conditions have been obtained, namely, the glass 21 raised to a temperature of about 150° in a surrounding inert gas, the valve 12 is closed and the valve 13 opened momentarily. The gas flowing over the liquid nickel carbonyl in the U tube 17 forms a carrier for such of the nickel carbonyl which has volatilized and the moment the latter reaches the glass 21 it is decomposed and nickel is deposited on the surface of the glass. According to former practice this operation is continued until the nickel forms an opaque film on the glass and is effective for certain purposes, but it cannot be electroplated for the reason heretofore pointed out.

According to my invention the valve 13 is closed as soon as a thin deposit of nickel has been formed on the glass. This condition may be observed by the operator through the transparent top of the cover 14.

This initial nickel deposit is then exposed to air, which is easily accomplished by lifting the cover 14 from the hot plate 20. This produces a slight degree of oxidization, a barely perceptible change in color being noticed. The oxidized surface thus formed adheres tenaciously to the glass, but is too thin to form an electrode of sufficient conductivity for electroplating at practical current densities.

The cover 14 is then replaced over the thinly coated glass and the process repeated. More nickel is deposited on the oxidized deposit until a film has been formed of sufficient thickness to serve as the cathode of an electroplating bath. This second deposit usually renders the film opaque.

The mirror or metallized article so produced may be used as it is, but to carry the process to completion the object is now transferred after cooling to room temperature to an electroplating bath where it is given a deposit of the particular metal desired. Far greater thicknesses of metal can now be applied than is possible without the steps comprising the body of this invention, without which peeling and blistering of the film from the article result.

I find that carbon dioxide is particularly desirable for use as the carrier gas in the aforesaid apparatus.

As a specific way of using this method I apply rhodium to the treated nickel surface to make the coating whiter, harder, more resistant to corrosion and to increase its reflectivity. In this simple manner a superior first surface mirror may be formed which is suitable for optical instruments, television apparatus and many other uses.

My invention is in no sense limited to the specific product described. By using modifications within the spirit and scope of this invention, it is possible to form compound metallic films of many metals on materials which are non-conductive and I intend no limitations other than those imposed by the following claim.

What I claim is:

A first surface mirror comprising a body of dielectric material having a smooth outer polished surface, a three layer compound metallic reflecting film built up on said smooth surface, said film comprising a primary coating of oxidized nickel formed on said surface and bonded thereto an intermediate coating of nickel on said primary coating and an outer deposit of electrolytically precipitated rhodium.

HAROLD MARTIN LANG.